(12) United States Patent
Op de Beeck et al.

(10) Patent No.: US 11,806,847 B2
(45) Date of Patent: Nov. 7, 2023

(54) TORQUE APPLICATION APPARATUS

(71) Applicant: DRiV Automotive Inc., Lake Forest, IL (US)

(72) Inventors: Frederic Frans S. Op de Beeck, Herenthout (BE); Bert Louis Jozef Diels, Geel (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 17/463,867

(22) Filed: Sep. 1, 2021

(65) Prior Publication Data
US 2023/0061313 A1   Mar. 2, 2023

(51) Int. Cl.
*B25B 23/142*  (2006.01)
*B25B 23/14*   (2006.01)
*B60G 13/00*   (2006.01)

(52) U.S. Cl.
CPC ........ *B25B 23/1427* (2013.01); *B25B 23/141* (2013.01); *B60G 13/001* (2013.01)

(58) Field of Classification Search
CPC ... B25B 23/1427; B25B 23/141; B25B 13/48; B25B 13/10; B25B 13/105; B25B 13/28; B25B 13/30; B25B 13/32; B25B 13/50; B25B 13/5008; B25B 13/5016; B60G 13/001; G04D 1/10
USPC .......... 81/483, 62, 59.1, 60, 61, 64, 176.15, 81/176.2, 6; 192/143, 43, 43.1, 43.2
See application file for complete search history.

(56) References Cited

U.S. PATENT DOCUMENTS

| 760,766 | A | * | 5/1904 | Swilley .................. B25B 13/463 81/62 |
| 2,774,270 | A | | 12/1956 | Daniels |
| 3,077,801 | A | * | 2/1963 | Irven ....................... B25B 13/08 81/61 |
| 3,379,286 | A | | 4/1968 | Takagi |
| 3,570,635 | A | | 3/1971 | Takagi |
| 4,569,257 | A | | 2/1986 | Hess |
| 4,765,446 | A | | 8/1988 | Murata et al. |
| 4,874,066 | A | | 10/1989 | Silberstein |
| 4,953,671 | A | | 9/1990 | Imaizumi |
| 5,058,715 | A | | 10/1991 | Silberstein |
| 5,248,014 | A | | 9/1993 | Ashiba |
| 5,505,225 | A | | 4/1996 | Niakan |

(Continued)

FOREIGN PATENT DOCUMENTS

EP   1788276 A2   5/2007
JP   2011-64284 A   3/2011

(Continued)

OTHER PUBLICATIONS

Extended European Search Report from European Patent Office (EPO) regarding EP Application 22190579.7 dated Jan. 24, 2023 (8 pages).

*Primary Examiner* — Brian D Keller
*Assistant Examiner* — Sukwoo James Chang
(74) *Attorney, Agent, or Firm* — DRiV Automotive Inc.

(57) ABSTRACT

An apparatus for applying torque to a body includes a base defining an inner chamber. The apparatus includes a plurality of pins supported by base and disposed in the inner chamber, the plurality of pins moveable relative to the base between engaged positions and disengaged positions. The apparatus includes a trigger actuatable to move at least one of the plurality of pins to the disengaged position.

19 Claims, 5 Drawing Sheets

(56) References Cited

U.S. PATENT DOCUMENTS

| | | | |
|---|---|---|---|
| 6,220,409 | B1 | 4/2001 | Deferme |
| 6,742,418 | B2 * | 6/2004 | Amami ............... B25B 23/1427 |
| | | | 81/57.39 |
| 6,918,473 | B2 | 7/2005 | Deferme |
| 7,100,750 | B2 | 9/2006 | Drees |
| 8,516,927 | B1 * | 8/2013 | Wang .................... B60B 29/003 |
| | | | 81/58 |
| 8,590,677 | B2 | 11/2013 | Kim |
| 8,651,252 | B2 | 2/2014 | Katayama et al. |
| 8,695,766 | B2 | 4/2014 | Yamashita et al. |
| 8,833,532 | B2 | 9/2014 | Yamashita |
| 8,844,687 | B2 | 9/2014 | Yu et al. |
| 9,010,509 | B2 * | 4/2015 | Kobayashi ............. F16D 41/16 |
| | | | 173/104 |
| 9,027,719 | B2 | 5/2015 | Ito |
| 9,239,092 | B2 | 1/2016 | Nowaczyk et al. |
| 9,291,231 | B2 | 3/2016 | Kim et al. |
| 9,541,153 | B2 | 1/2017 | Park |
| 10,518,601 | B2 | 12/2019 | Van De Plas et al. |
| 2006/0090608 | A1 * | 5/2006 | Tsai ...................... B25B 13/463 |
| | | | 81/62 |
| 2015/0144444 | A1 | 5/2015 | Lim |
| 2016/0025180 | A1 | 1/2016 | Fukushima et al. |
| 2016/0193721 | A1 * | 7/2016 | Douglass .............. B25B 13/462 |
| | | | 81/59.1 |
| 2016/0288604 | A1 | 10/2016 | Teraoka et al. |
| 2016/0288605 | A1 | 10/2016 | Teraoka et al. |
| 2020/0141468 | A1 | 5/2020 | Maeda et al. |

FOREIGN PATENT DOCUMENTS

| | | |
|---|---|---|
| JP | 5851159 B2 | 2/2016 |
| JP | 5981800 B2 | 8/2016 |
| JP | 2017-48817 A | 3/2017 |
| JP | 2019-27460 A | 2/2019 |
| JP | 6681823 B2 | 4/2020 |
| KR | 101014305 B1 | 2/2011 |
| KR | 101272755 B1 | 6/2013 |
| WO | 2005072173 A2 | 8/2005 |
| WO | 2015082147 A1 | 6/2015 |
| WO | 2017125478 A1 | 7/2017 |

* cited by examiner

TORQUE APPLICATION APPARATUS

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle. Components of the dampers may be engaged with each other via threads, e.g., the components may be screwed together.

DETAILED DESCRIPTION

An apparatus for applying torque to a body of a damper assembly includes a base defining an inner chamber. The apparatus includes a plurality of pins supported by base and disposed in the inner chamber. The plurality of pins are moveable relative to the base between engaged positions and disengaged positions. The apparatus includes a trigger actuatable to move at least one of the plurality of pins to the disengaged position.

To apply torque to the body with the apparatus, an assembly is formed with the body disposed in the inner chamber of the base. The pins, in the engaged positions, are disposed in the plurality of openings. The pins, in the disengaged positions, are out of the openings. Movement of the pins between the engaged position and the disengaged position enables the apparatus to be easily engaged with the body to apply torque thereto to be easily disengaged from the body to separate the apparatus from the body, e.g., after application of torque.

Figure 1:
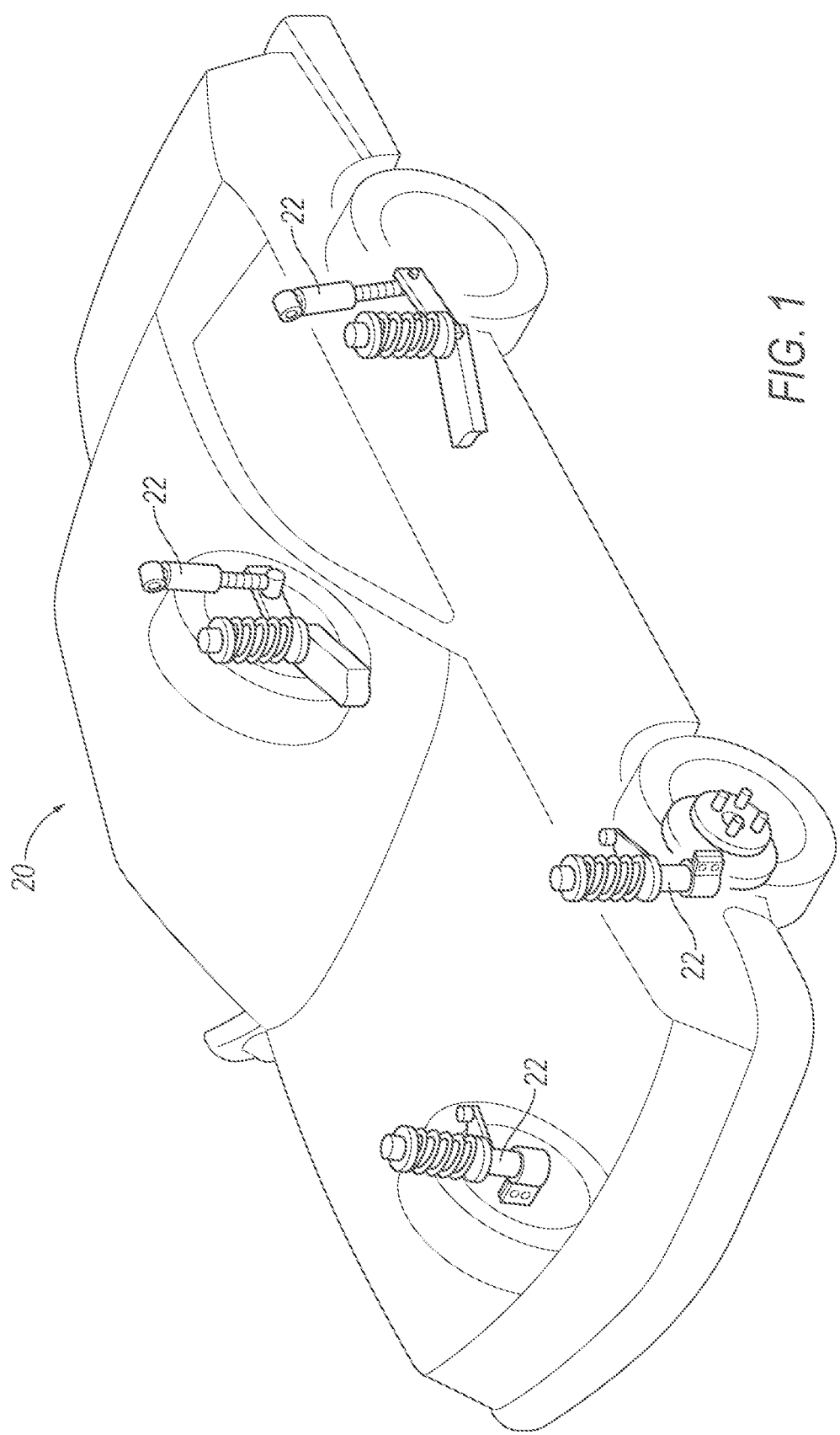
FIG. 1 is a perspective view of a vehicle having a plurality of damper assemblies.

With reference to FIG. 1, and wherein like numerals indicate like elements throughout the several views, a vehicle 20 having a plurality of damper assemblies 22 is shown. The vehicle 20 may be any suitable type of ground vehicle, e.g., a passenger or commercial automobile such as a sedan, a coupe, a truck, a sport utility, a crossover, a van, a minivan, a taxi, a bus, etc.

The damper assemblies 22 are typically used in conjunction with automotive suspension systems or other suspension systems to control movement of wheels of the vehicle 20 relative to a body of the vehicle 20. In order to control movement, damper assemblies 22 are generally connected between the sprung (body) and the unsprung (suspension/drivetrain) masses of the vehicle 20. Each damper assembly 22 may be coupled with a coil spring. Each damper assembly 22 is movable from a compressed position to an extended position, and vice versa. A distance between ends of the damper assembly 22, i.e., the distance from one end to the other end, is less in the compressed position than in the extended position. The coil springs, or the like, may urge the damper assemblies 22 toward the extended positions. Force applied to wheels of the vehicle 20, e.g., from bumps, potholes, etc., may urge to damper assemblies 22 toward the compressed position.

Each damper assembly 22 controls movement of respective wheels by limiting fluid flow into, out of, and/or between various chambers of the damper assembly 22, e.g., into, out of, and/or between a compression chamber and a rebound chamber, between a reserve chamber and the compression chamber and/or the rebound chamber, etc. Fluid movement is caused by movement of a piston within a pressure tube of the damper assembly 22, e.g., when the damper assembly 22 is moved toward the compressed position or the extended position.

Figure 2:
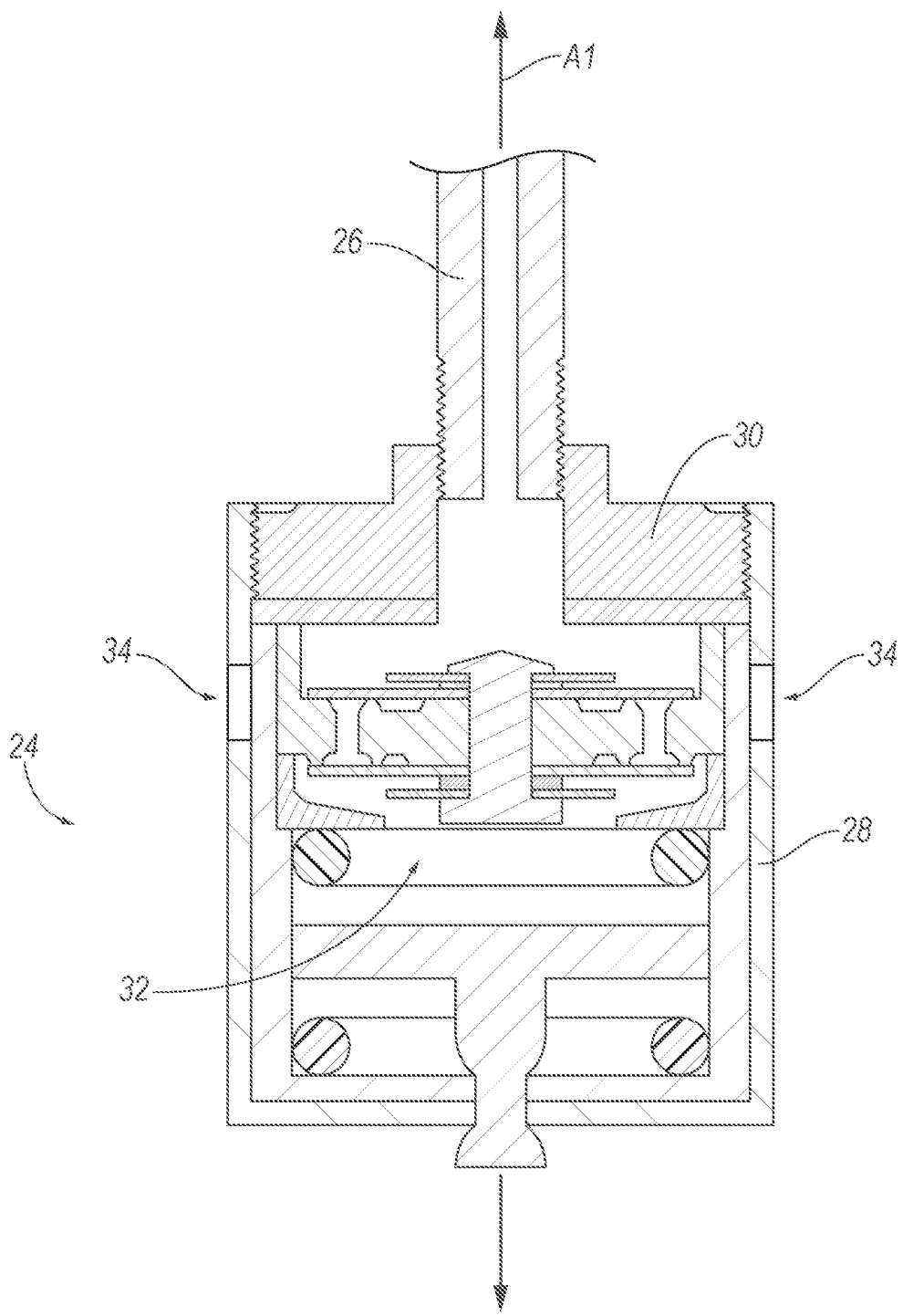
FIG. 2 is a cross-section of components of one of the damper assemblies, the components including a rod and a valve assembly.

Each damper assembly 22 may include one or more valve assemblies that control fluid flow, e.g., through one or more passages connecting the rebound chamber, the compression chamber, and/or the reserve chamber. The valve assemblies may include springs, blow-off discs, restriction discs, etc. For example, and with reference to FIG. 2, a rod end valve assembly 24 is shown. The rod end valve assembly 24 is secured to an end of a hollow piston rod 26, e.g., controlling fluid flow into and out a passage of the piston rod 26.

The rod end valve assembly 24 includes a housing body 28 and an end body 30. The housing body 28 and the end body 30 enclose valve elements 32 that regulate fluid flow, e.g., in response to a change in fluid pressure or flow direction. The valve elements 32 disposed in the housing body 28 may include, e.g., springs, valve discs, checks disc, or other suitable structure for regulating fluid flow. The housing body 28 may be generally cylindrical. The housing body 28 may threadedly engage the end body 30, e.g., via a first pair of engaged threads. The end body 30 may threadedly engage the piston rod 26, e.g., via a second pair of engaged threads.

The housing body 28 defines a plurality of openings 34. The openings 34 may be between axially spaced ends of the housing body 28. The openings 34 may be spaced from each other circumferentially about the housing body 28, e.g., with equal spacing therebetween. The openings 34 may extend radially through the housing body 28, e.g., from interior to exterior the housing body 28. The terms axially, circumferentially, and radially used herein are relative to an axis A1, e.g., as shown in FIGS. 2-5.

Figure 3:
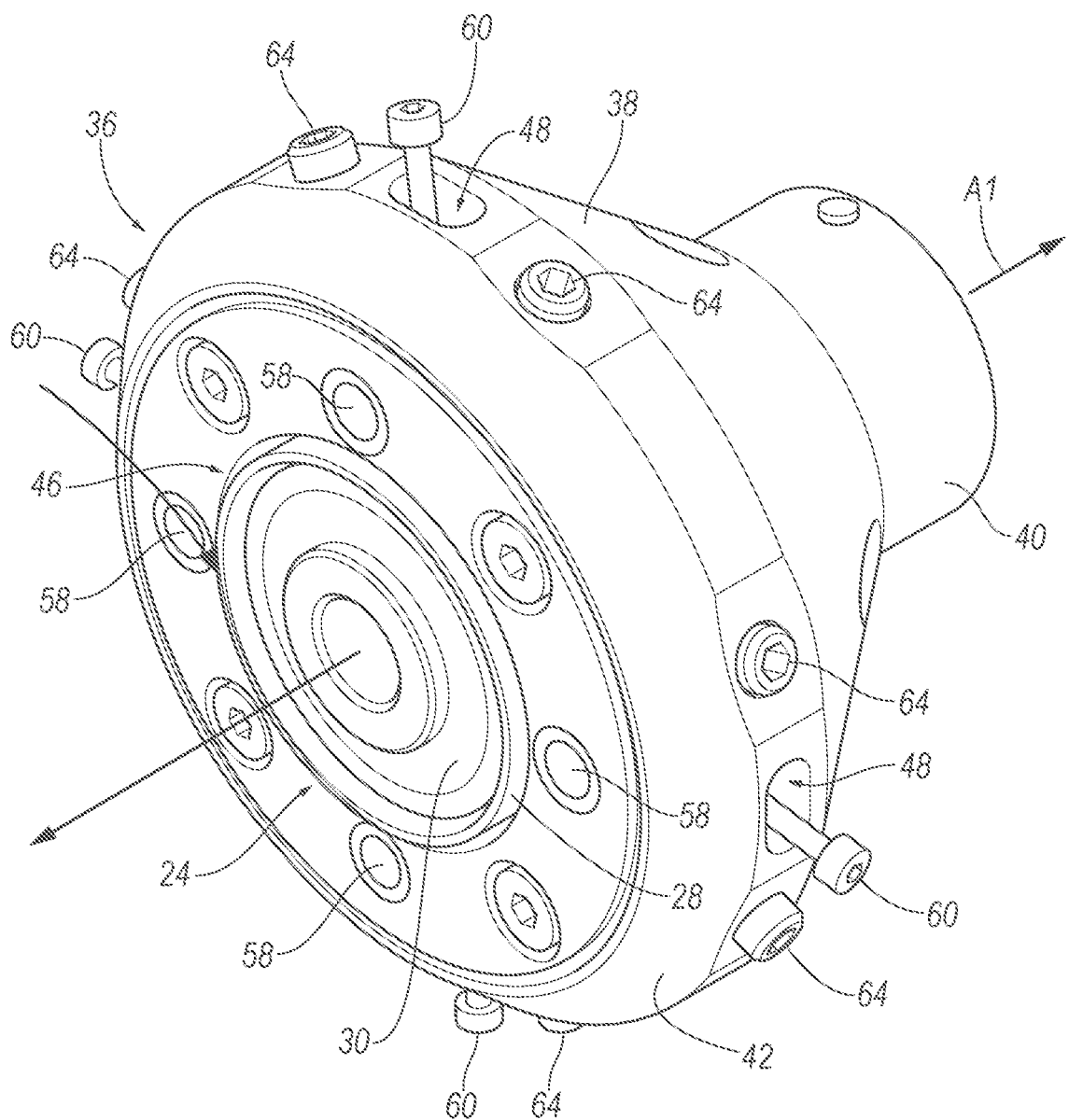
FIG. 3 is a perspective view of the valve assembly disposed within an apparatus for applying torque.
Figure 4:
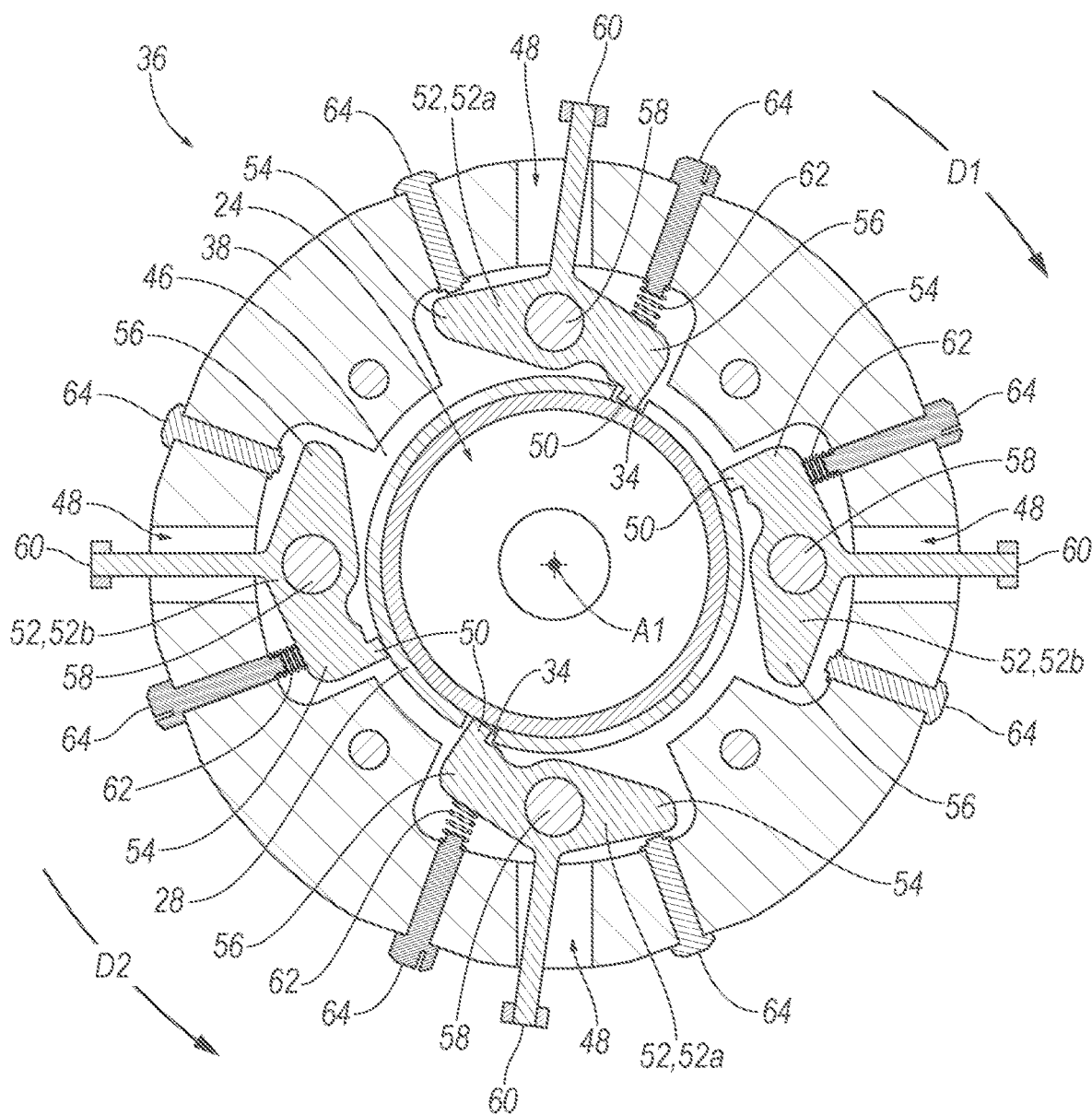
FIG. 4 is cross-section view of the valve assembly disposed within the apparatus of FIG. 3.
Figure 5:
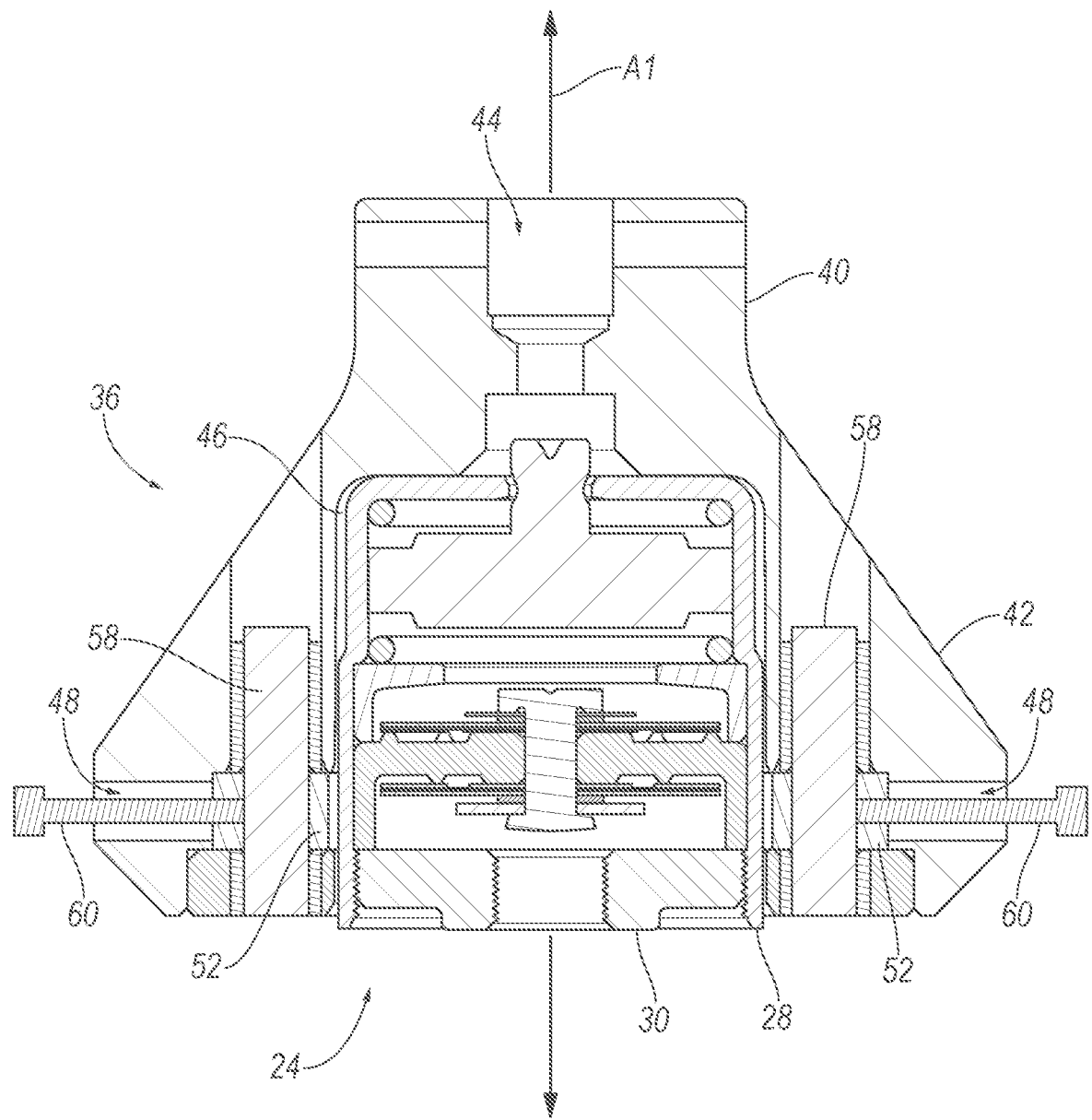
FIG. 5 is cross-section view of the valve assembly disposed within the apparatus of FIG. 3.

With reference to FIGS. 3-5, an apparatus 36 for applying torque to the housing body 28 is shown, e.g., to threading engage (i.e., tighten) and/or disengage (i.e., loosen) the housing body 28 and the end body 30, and/or the end body 30 and the piston rod 26. The apparatus 36 applies torque to the housing body 28, e.g., via application of force to the openings 34. The torque applied by the apparatus 36 may be provided by, for example, a machine, a human with a wrench or other tool, etc.

The apparatus 36 includes a base 38. The base 38 may have a generally frustoconical outer profile. The base 38 may have a top end 40 and a bottom end 42 that is wider than the top end 40. The top end 40 may be configured to engage with a torque application tool such as a wrench, driver, etc. For example, the top end 40 may define a recession 44 or a protrusion of a certain shape, e.g., square, hexagonal, etc. In other words, the base 38 may include structure to engage a socket wrench, a hex key, a square drive, etc.

The base 38 defines an inner chamber 46. For example, the base 38 may circumferentially surround the inner chamber 46. The base 38 may extend axially along an entirety of the inner chamber 46. The inner chamber 46 may be open at the bottom end 42, e.g., permitting the housing body 28 to be placed into, or removed from, the inner chamber 46. The inner chamber 46 may be generally cylindrical, e.g., having a diameter and/or a length that are both greater than a diameter and/or a length of the housing body 28.

The base 38 may define one or more passages 48. Each of the passages 48 may extend from the inner chamber 46 to an outer surface of the base 38. For example, the passages 48 may extend radially outward from inner chamber 46 and entirely through the base 38. The passages 48 may be between the top end 40 and the bottom end 42 of the base 38. The passages 48 may be spaced from each other circumferentially about the base 38, e.g., with equal spacing therebetween.

The apparatus 36 includes a plurality of pins 50 supported by the base 38. The pins 50 selectively engage the housing body 28, e.g., to apply torque thereto. The pins 50 are disposed in the inner chamber 46 and movable relative to the base 38 between engaged positions and disengaged positions. The engaged positions may be radially inward of the disengaged positions. The pins 50 in the engaged positions inhibit rotation of the base 38 relative to the housing body 28. For example, the pins 50 in the engaged positions may be in the plurality of openings 34 of the housing body 28. The pins 50 in the engaged positions may extend from outside the housing body 28 into the openings 34. The pins 50 in the engaged positions may transmit torque to the housing body 28 via normal forces between the pins 50 and sides of the openings 34. The pins 50 in the disengaged positions permit rotation of the base 38 relative to the housing body 28. The pins 50 in the disengaged positions may be out of the openings 34, e.g., spaced radially outward from the housing body 28.

The apparatus 36 may include one or more cams 52. The cams 52 provide movement of the pins 50 between the engaged positions and the disengaged positions. The pins 50 and the cams 52 may be unitary. Unitary means a single, uniform piece of material with no seams, joints, fasteners, or adhesives holding it together, i.e., formed together simultaneously as a single continuous unit, e.g., by machining from a monolithic blank, molding, forging, casting, etc. Non-unitary components, in contrast, are formed separately and subsequently assembled, e.g., by threaded engagement, welding, etc. Each of the cams 52 may be elongated, e.g., circumferentially, between a first end 54 and a second end 56. Each of the pins 50 may be fixed to a respective one of the cams 52, e.g., to the first end 54 or the second end 56. Each of the cams 52 may be supported by, and pivotable relative to, the base 38. For example, pivot pins 58 may connect the cams 52 to the base 38. The pivot pins 58 may be disposed a hole. The cams 52 may pivot about the pivot pins 58. The apparatus 36 may include any other suitable structure to permit pivot of the cams 52 relative to the base 38. Each of the pivot pins 58 may be between the first end 54 and the second end 56 of the respective cam 52. Pivoting the cam 52 about the pivot pin 58 may move the first end 54 of such cam 52 radially inward and the second end 56 of such cam 52 radially outward, and vice versa when the cam 52 is pivoted in an opposite direction. Each pivot pin 58 may provide rotation about a respective second axis that is parallel to the axis A1.

One or more of the cams 52a of the cams 52 may be positioned relative to the base 38 to move the pins 50 attached thereto toward the engaged positions upon rotation of the base 38 in a first direction D1 and to move the pins 50 attached thereto toward the disengaged positions upon rotation of the base 38 in a second direction D2 opposite the first direction D1. For example, the first direction D1 may be clockwise and the pin 50 may be fixed to the cam 52a clockwise of the pivot pin 58. Normal forces between such pin 50 the housing body 28 may urge the cam 52a to pivot clockwise and urge the pin 50 toward the housing body 28 upon rotation in the first direction D1. Normal forces between such pin 50 and the housing body 28 may urge the cam 52a to pivot counterclockwise and urge the pin 50 away from the housing body 28 to the disengaged position upon rotation in the second direction D2, e.g., counterclockwise. For example, a distal end of the pin 50 may include an angled surface (not shown), such as a bevel or a chamfer, e.g., at a side of the pin 50 closest to the respective pivot pin 58. Normal forces between the angled surface and the housing body 28 may urge the pin 50 out of the opening 34 to the disengaged position.

One or more other cams 52b of the cams 52 may be positioned relative to the base 38 to move the pins 50 attached thereto toward the engaged position upon rotation of the base 38 in the second direction D2 and to move the second pin 50 toward the disengaged position upon rotation of the base 38 in the first direction D1. For example, the pin 50 may be fixed to the cam 52b counterclockwise of the pivot pin 58. Normal forces between such pin 50 and the housing body 28 may urge the cam 52b to pivot counterclockwise and urge the pin 50 toward the housing body 28 upon rotation in the second direction D2. Normal forces between such pin 50 and the housing body 28 may urge the cam 52b to pivot clockwise and urge the pin 50 away from the housing body 28 to the disengaged position upon rotation in the first direction, e.g., clockwise.

Although shown as having cams 52 oriented in multiple directions, the apparatus 36 may only include cams 52 positioned in one direction relative to the base 38, e.g. such that the cams 52 and the pins 50 transfer torque to the housing body 28 when the apparatus 36 is rotated in one direction, and not in the opposite direction.

The apparatus 36 may include any other suitable structure for providing movement of the pins 50 between the engaged positions and the disengaged positions, e.g., in addition, or as an alternative, to the cams 52 and pivot pins 58.

The apparatus 36 includes one or more triggers 60 actuatable to move one or more of the pins 50 to the disengaged positions. For example, application of force on the trigger 60, e.g., by a human, may move one or more of the pins 50 from the engaged positions to the disengaged positions. Application of force on the trigger 60 may pivot the cam 52 about the pivot pin 58. The trigger 60 may be operatively coupled to the cam 52 to pivot the cam 52 upon actuation of the trigger 60. For example, each of the cams 52 may have a respective one of the triggers 60 fixed thereto, e.g., via fastener, threaded engagement, weld, etc. The triggers 60 may be disposed in the passages 48 of the base 38, e.g., with one trigger 60 in each of the passages 48. The trigger 60 may extend radially outward from the cams 52 through the passages 48. The trigger 60 may extend away from the inner chamber 46 to beyond an outer surface of the base 38.

The apparatus 36 may include one or more springs 62 that urge one or more of the pins 50 toward the engaged positions. The springs 62 may include elastically deformable material, such as spring 62 steel. The springs 62 may, for example, be coil compression springs 62. The springs 62 may include any suitable structure that provides resilient responsive force. The springs 62 may be supported by the base 38. The springs 62 may be compressed between the cams 52 and the base 38, e.g., between the first end 54 or the second end 56 and the base 38. The spring 62 may be at a same end as the pin 50. For example, the pin 50 and the spring 62 may both be at the first end 54 or the second end 56 of the cam 52. The spring 62 may urge the respective first end 54 or second end 56 of the cam 52, and the pin 50 attached thereto, radially inward.

The apparatus 36 may include one or more set screws 64, e.g., that control an amount of compression of the springs 62. The set screws 64 may be supported by, and threading engaged with, the base 38. Rotating the set screw 64 in a tightening direction may increase compression of the spring 62. For example, rotating the set screw 64 in the tightening direction may move the set screw 64 radially inward. The tightening direction may be, for example, clockwise. Rotation of the set screw 64 in a loosening direction may decrease compression of the spring 62. For example, rotating the set screw 64 in the loosening direction may move the set screw 64 radially outward. The loosening direction may be opposite the tightening direction, for example, counter-clockwise. The set screws 64 may be supported by the base 38 at the cams 52, e.g., at the first ends 54 and/or the second ends 56. The set screw 64 may be, for example, at the same end of the cam 52 as the spring 62. The set screws 64 may be circumferentially spaced from each other, e.g., around an outer perimeter of the inner chamber 46. The set screws 64 may abut the springs 62. Moving the set screws 64 radially inward or outward may change an amount of space in which the springs 62 is compressed between the cam 52 and the set screws 64. The passage 48 may be between the set screws 64, e.g., such that the trigger 60 is circumferentially between a respective pair of the set screws 64 that are at the first end 54 and second end 56 of a respective one on the cams 52. Such configuration enables the cam 52 to be assembled to face one direction or an opposite direction, e.g., such that one of the set screws 64 of the pair can be used with the spring 62 when the cam 52a is facing one direction and that the other of the set screws 64 of the pair can be used with the spring 62 when the cam 52b is facing the opposite direction.

To apply torque with the apparatus 36, the triggers 60 may be actuated to move the pins 50 to the disengaged positions and the housing body 28 may be inserted into the inner chamber 46. The housing body 28 disposed in the inner chamber 46 may be positioned relative to the apparatus 36 such that the pins 50 align with, and engage, the openings 34. Torque may be applied to the apparatus 36 via the top end 40, and transferred to the housing body 28 via engagement of the pins 50 with the openings 34.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An apparatus for applying torque to a body, the apparatus comprising:
   a base defining an inner chamber;
   a plurality of pins that includes at least a first pin and a second pin, the plurality of pins supported by the base and disposed in the inner chamber, each pin of the plurality of pins moveable relative to the base between an engaged position and disengaged position;
   a first trigger actuatable to move the first pin of the plurality of pins to the disengaged position;
   a second trigger actuatable to move the second pin of the plurality of pins to the disengaged position; and
   a cam supported by and pivotable relative to the base, the first pin fixed to the cam, the cam positioned relative to the base to move the first pin toward the engaged position upon rotation of the base in a first direction and to move the first pin toward the disengaged position upon rotation of the base in a second direction opposite the first direction.

2. The apparatus of claim 1, wherein the pins in the engaged positions inhibit rotation of the base relative to the body and in the disengaged positions permit rotation of the base relative to the body.

3. The apparatus of claim 1, further comprising a spring supported by the base and urging at least one of the plurality of pins toward the engaged position.

4. The apparatus of claim 1, wherein the first pin extends radially inward relative to an axis, the base defines a first passage that extends radially outward relative to the axis from the inner chamber to an outer surface of the base, the first trigger disposed in the first passage, and the base defines a second passage that extends radially outward relative to the axis from the inner chamber to the outer surface of the base, the second trigger disposed in the second passage.

5. The apparatus of claim 1, further comprising a second cam supported by and pivotable relative to the base, the second pin of the plurality of pins fixed to the second cam.

6. The apparatus of claim 5, wherein the second cam is positioned relative to the base to move the second pin toward the engaged position upon rotation of the base in the second direction and to move the second pin toward the disengaged position upon rotation of the base in the first direction.

7. The apparatus of claim 5, wherein the first trigger is operatively coupled to the cam to pivot the cam upon actuation of the first trigger and the second trigger is operatively coupled to the second cam to pivot the second cam upon actuation of the second trigger.

8. The apparatus of claim 1, further comprising a spring compressed between the cam and the base.

9. The apparatus of claim 8, further comprising a set screw supported by the base at the cam, rotation of the set screw in a tightening direction increases compression of the spring and rotation of the set screw in a loosening direction decreases compression of the spring.

10. The apparatus of claim 9, further comprising a second set screw supported by the base at the cam, the second set screw circumferentially spaced from the set screw, and wherein the cam includes a first end, a second end, and a pivot therebetween, the set screw at the first end and the second set screw at the second end.

11. The apparatus of claim 10, wherein the cam includes a first end, a second end, and a pivot therebetween, the set screw at the first end and the second set screw at the second end.

12. The apparatus of claim 10, wherein the base defines a passage that extends from the inner chamber to an outer surface of the base, the passage is between the set screw and the second set screw, and the trigger is disposed in the passage.

13. The apparatus of claim 1, wherein the cam includes a first end, a second end, and a pivot therebetween, the first pin is fixed to the first end of the cam, and actuation of the first trigger to move the first pin to the disengaged position moves the first end of the cam radially outward relative to the axis and the second end of the cam radially inward relative to the axis.

14. An assembly, comprising:
a base defining an inner chamber,
a body defining a plurality of openings, the body disposed in the inner chamber;
a valve element disposed in the body;
a plurality of pins supported by the base and disposed in the inner chamber, the plurality of pins moveable relative to the base between engaged positions in the plurality of openings and disengaged positions out of the openings; and
a trigger actuatable to move at least one of the plurality of pins to the respective disengaged position.

15. The assembly of claim 14, further comprising a hollow rod connected to the body, the valve element controlling fluid flow into or out of the hollow rod.

16. The assembly of claim 14, further comprising a cam supported by and pivotable relative to the base, at least one of the plurality of pins fixed to the cam.

17. The assembly of claim 16, wherein the cam includes a first end, a second end, and a pivot therebetween, and the trigger is operatively coupled to the cam to pivot the cam and move the first end of the cam radially inward relative to an axis and the second end radially outward relative to the axis upon actuation of the trigger.

18. The assembly of claim 16, further comprising a spring compressed between the cam and the base.

19. An apparatus for applying torque to a body, the apparatus comprising:
a base defining an inner chamber;
a plurality of pins that includes at least a first pin and a second pin, the plurality of pins supported by the base and disposed in the inner chamber, each pin of the plurality of pins moveable relative to the base between an engaged position and disengaged position;
a first trigger actuatable to move the first pin of the plurality of pins to the disengaged position; and
a second trigger actuatable to move the second pin of the plurality of pins to the disengaged position;
wherein the first pin extends radially inward relative to an axis, the base defines a first passage that extends radially outward relative to the axis from the inner chamber to an outer surface of the base, the first trigger disposed in the first passage, and the base defines a second passage that extends radially outward relative to the axis from the inner chamber to the outer surface of the base, the second trigger disposed in the second passage.

* * * * *